(12) United States Patent
Iwamoto

(10) Patent No.: US 11,701,611 B2
(45) Date of Patent: Jul. 18, 2023

(54) CANISTER

(71) Applicant: FUTABA INDUSTRIAL CO., LTD., Aichi (JP)

(72) Inventor: Koji Iwamoto, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 17/406,518

(22) Filed: Aug. 19, 2021

(65) Prior Publication Data

US 2022/0062813 A1    Mar. 3, 2022

(30) Foreign Application Priority Data

Aug. 31, 2020    (JP) .............................. JP2020-145692

(51) Int. Cl.
*B01D 53/04*    (2006.01)
*B60K 15/035*    (2006.01)
*B60K 15/03*    (2006.01)

(52) U.S. Cl.
CPC ........ *B01D 53/0415* (2013.01); *B60K 15/035* (2013.01); *B01D 2253/102* (2013.01); *B01D 2257/702* (2013.01); *B01D 2259/40083* (2013.01); *B01D 2259/4516* (2013.01); *B01D 2259/4566* (2013.01); *B60K 2015/03236* (2013.01)

(58) Field of Classification Search
CPC ................ F02D 2250/02; F02M 25/08; F02M 25/0836; F02M 25/0872; F02M 25/089; F02M 55/007
USPC .................................. 123/516–519, 523–527
See application file for complete search history.

(56) References Cited

U.S. PATENT DOCUMENTS

| 7,134,426 | B2 | 11/2006 | Uchino et al. |
| 8,015,965 | B2 | 9/2011 | Yamasaki |
| 8,360,034 | B2 | 1/2013 | Yamasaki |
| 8,443,786 | B2 | 5/2013 | Yamasaki |

(Continued)

FOREIGN PATENT DOCUMENTS

| JP | H06307300 A | 11/1994 |
| JP | 4173065 B2 | 10/2008 |

(Continued)

OTHER PUBLICATIONS

Japanese Notice for Reasons of Refusal dated Aug. 2, 2022 for corresponding Japanese Application No. 2020-145692, filed Aug. 31, 2020.

*Primary Examiner* — John Kwon
(74) *Attorney, Agent, or Firm* — David D. Brush; Westman, Champlin & Koehler, P.A.

(57) ABSTRACT

A canister that adsorbs and desorbs an evaporated fuel generated in a fuel tank of a vehicle includes an outer case, an inner case, a connecting port, and a sealing member. The inner case has a cylindrical shape. The inner case is fitted into the outer case. The inner case is filled therein with an adsorbent in a granular form. The inner case includes a first end and a second end. The connecting port connects an inside and an outside of the outer case to each other. The sealing member is provided to the second end of the inner case located opposite to the first end leading to the connecting port. The sealing member seals a gap between the outer case and a joining portion of the inner case. The joining portion joins the inner case to the outer case.

5 Claims, 4 Drawing Sheets

(56) References Cited

U.S. PATENT DOCUMENTS

| | | | |
|---|---|---|---|
| 2005/0011909 A1* | 1/2005 | Hanell | B67B 7/26 |
| | | | 222/543 |
| 2005/0172938 A1 | 8/2005 | Uchino et al. | |
| 2007/0169640 A1* | 7/2007 | Sato | A47J 31/3619 |
| | | | 99/495 |
| 2009/0013973 A1 | 1/2009 | Yamasaki | |
| 2011/0077150 A1 | 3/2011 | Yamasaki | |
| 2011/0077151 A1 | 3/2011 | Yamasaki | |
| 2022/0065202 A1* | 3/2022 | Iwamoto | F02M 25/0854 |
| 2022/0120153 A1* | 4/2022 | Lybbert | E21B 25/02 |

FOREIGN PATENT DOCUMENTS

| | | |
|---|---|---|
| JP | 2009019572 A | 1/2009 |
| JP | 4589422 B2 | 12/2010 |

* cited by examiner

＃ CANISTER

CROSS-REFERENCE TO RELATED APPLICATIONS

This application claims the benefit of Japanese Patent Application No. 2020-145692 filed on Aug. 31, 2020 with the Japan Patent Office, the entire disclosure of which is incorporated herein by reference.

BACKGROUND

The present disclosure relates to a canister.

A vehicle such as an automobile is mounted with a canister that reduces discharge, into the atmosphere, of an evaporated fuel generated in a fuel tank. The canister is filled therein with an adsorbent such as activated carbon. The evaporated fuel generated in the fuel tank is introduced into the canister and then temporarily adsorbed on the adsorbent. The adsorbed evaporated fuel is desorbed from the adsorbent in response to a start of an internal combustion engine. Then, the desorbed evaporated fuel is supplied to the internal combustion engine.

In order to reduce the discharge of the evaporated fuel into the atmosphere, it is advantageous to increase a ratio (L/D) of a length L of an adsorbent layer in a gas flow direction to an effective cross-sectional diameter D of the adsorbent layer in a cross-section perpendicular to the gas flow direction. In general, a required value of the L/D varies depending on a type of vehicle to be mounted with a canister. Thus, it is necessary to separately manufacture canisters having various specifications.

JP4173065 B2 discloses a canister comprising an outer case. The outer case is separately fitted therein with a cylindrical cartridge filled with an adsorbent. In such a configuration, the cartridge is appropriately manufactured depending on various L/D and fitted into the outer case. Accordingly, it is possible to easily and separately manufacture canisters having various specifications in terms of the L/D. That is, it is not necessary to change a design of the outer case.

SUMMARY

JP4173065 B2 discloses a method of manufacturing the canister. In the disclosed method, a cartridge filled with an adsorbent is prepared in advance. After the cartridge is fitted into the outer case, an adsorbent layer is closed with a filter. As a result of detailed study of this method, however, the inventor of the present invention has found out that a careful attention is to be paid so that the adsorbent does not leak out when the cartridge is fitted. That is, the above disclosed method provides poor assemblability and potential difficulty of automation.

For the reason above, the inventor of the present invention has considered fitting only a cylindrical case of the cartridge into the outer case and thereafter feeding the adsorbent from an opening of the case of the cartridge, to thereby fill the adsorbent in the cartridge. As a result of consideration, a new problem to be solved has been found. Specifically, there is a risk that the adsorbent may enter a gap between the outer case and the case of the cartridge when being filled.

One aspect of the present disclosure provides a canister that inhibits an adsorbent from entering a gap between an outer case and a case of a cartridge when being filled.

One aspect of the present disclosure is a canister that adsorbs and desorbs an evaporated fuel generated in a fuel tank of a vehicle. The canister comprises an outer case, an inner case, a connecting port, and a sealing member. The inner case has a cylindrical shape. The inner case is fitted into the outer case. The inner case is filled therein with an adsorbent in a granular form. The inner case includes a first end and a second end. The connecting port connects an inside and an outside of the outer case to each other. The sealing member is provided to the second end of the inner case that is located opposite to the first end leading to the connecting port. The sealing member seals a gap between the outer case and a joining portion of the inner case. The joining portion joins the inner case to the outer case.

According to the above configuration, the adsorbent is inhibited from entering the gap between the outer case and the inner case when being filled.

In one aspect of the present disclosure, an opening at the second end of the inner case may be shaped such that an opening area is reduced toward the first end of the inner case leading to the connecting port. According to this configuration, the opening at the second end of the inner case is wider and thus facilitates feeding of the adsorbent from the opening.

In one aspect of the present disclosure, the inner case may comprise a main body and a flange. The main body contains the adsorbent therein. The main body includes a first end and a second end. The flange is provided to the second end of the main body that is located opposite to the first end leading to the connecting port. The flange has a shape protruding from the main body to an inner surface of the outer case. The flange comprises the joining portion. A surface of the flange facing away from the connecting port may be approximately perpendicular to a central axis of the inner case. In a cross-section along the central axis, a width of the surface of the flange facing away from the connecting port may be smaller than an average particle diameter of the adsorbent. According to this configuration, the adsorbent is, when being filled, inhibited from remaining on the surface of the flange, which is approximately perpendicular to the central axis of the inner case and faces away from the connecting port.

In one aspect of the present disclosure, the inner case may comprise a main body and a flange. The main body contains the adsorbent therein. The main body includes a first end and a second end. The flange is provided to the second end of the main body that is located opposite to the first end leading to the connecting port. The flange has a shape protruding from the main body to an inner surface of the outer case. The flange comprises the joining portion. In a cross-section along a central axis of the inner case, a surface of the flange located opposite to the connecting port may inwardly lean toward the connecting port with respect to a surface perpendicular to the central axis. According to this configuration, the adsorbent is further inhibited from remaining on the joining portion of the inner case joined to the outer case when being filled.

In one aspect of the present disclosure, the inner case may comprise a main body and a flange. The main body contains the adsorbent therein. The main body includes a first end and a second end. The flange is provided to the second end of the main body that is located opposite to the first end leading to the connecting port. The flange has a shape protruding from the main body to an inner surface of the outer case. The flange comprises the joining portion. In a cross-section along a central axis of the inner case, a surface of the flange located opposite to the connecting port may have a shape inwardly and gradually curving toward the connecting port with respect to the central axis. According to this configuration, the adsorbent is further inhibited from remaining on the joining portion of the inner case joined to the outer case when being filled.

In one aspect of the present disclosure, the canister may further comprise an elastic member biasing the adsorbent to the connecting port. According to this configuration, the elastic member fixes the adsorbent inside the inner case. As a result, the adsorbent is inhibited from flowing and being pulverized in the inner case due to vibration of a vehicle.

In one aspect of the present disclosure, the canister may further comprise a charge port, a purge port, and an atmosphere port, a main chamber, and a sub chamber. The charge port is configured to draw the evaporated fuel. The purge port is configured to discharge the evaporated fuel. The atmosphere port is open to the atmosphere. The main chamber is provided with the charge port and the purge port. The sub chamber communicates the main chamber. Furthermore, the sub chamber is provided with the atmosphere port. The outer case may form the sub chamber and the main chamber. The inner case may be fitted into the sub chamber. The connecting port may comprise the atmosphere port.

According to this configuration, the inner case is fitted into the sub chamber, whereby it is possible to easily adjust the L/D of the sub chamber with a design of the outer case unchanged.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. First Embodiment

[1-1. Evaporated Fuel Treatment System]

Figure 1:
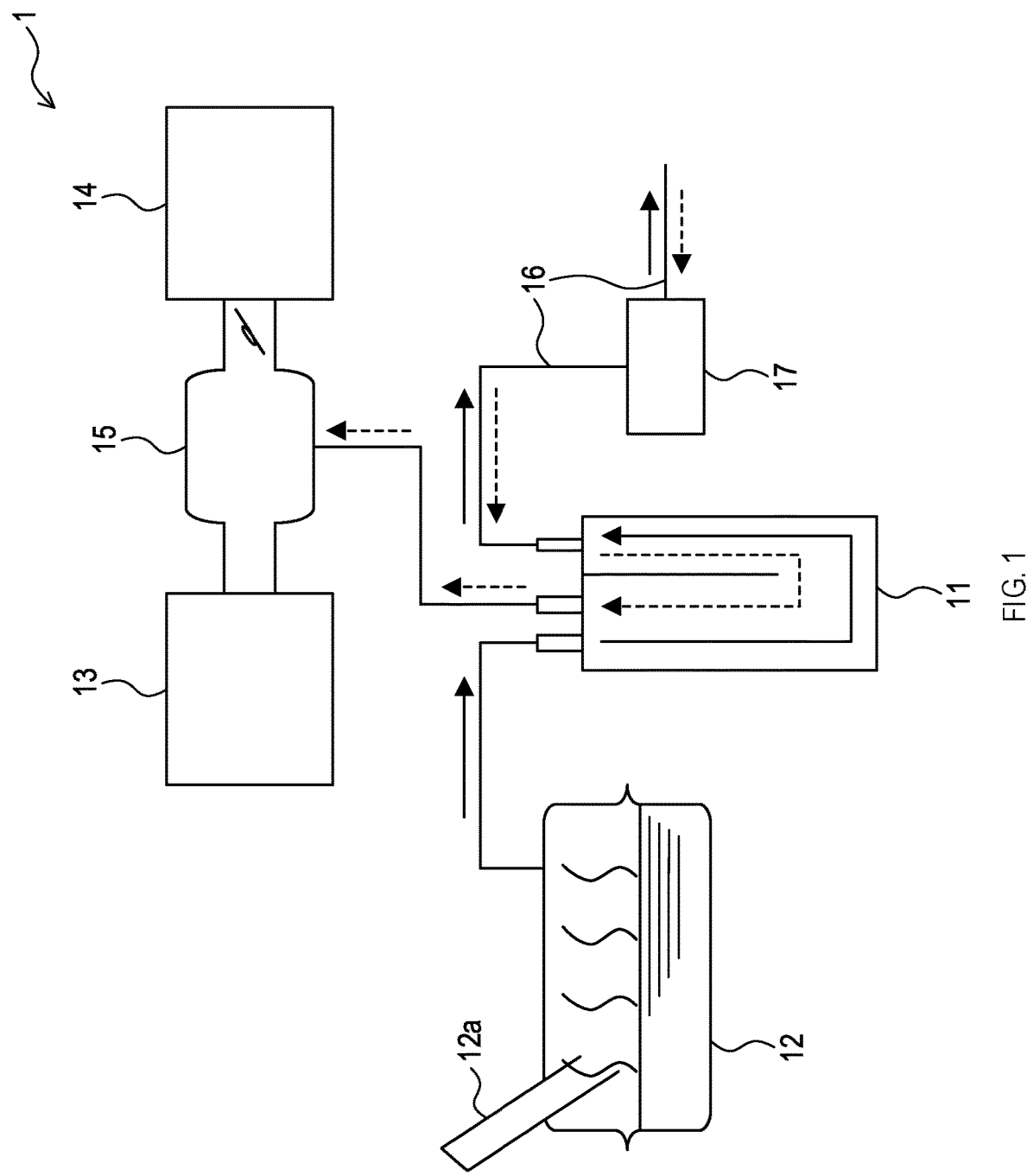
FIG. 1 is a diagram showing a configuration of an evaporated fuel treatment system.

An evaporated fuel treatment system 1 shown in FIG. 1 comprises a canister 11, a fuel tank 12, and an internal combustion engine 13.

The canister 11 is a device to adsorb and desorb an evaporated fuel generated in the fuel tank 12 of a vehicle such as an automobile. The canister 11 is coupled to the fuel tank 12 and to an intake manifold 15. The fuel tank 12 comprises a filling port 12a. The intake manifold 15 is coupled to the internal combustion engine 13 and to an air cleaner 14 for the internal combustion engine 13. Moreover, the canister 11 is coupled to an intake line 16 to supply air to the internal combustion engine 13. In the course of the intake line 16, an air cleaner 17 for the canister 11 is arranged.

The canister 11 is filled therein with an adsorbent (not shown). A configuration of the canister 11 will be detailed later.

While the internal combustion engine 13 does not run or is not running, the evaporated fuel generated in the fuel tank 12 is introduced into the canister 11 with air and is then adsorbed on the adsorbent placed in the canister 11. Then, air having a reduced content of the evaporated fuel is discharged into the atmosphere through the intake line 16.

On the other hand, in response to a start of the internal combustion engine 13, an air/fuel mixture is drawn into the internal combustion engine 13 and the evaporated fuel adsorbed on the adsorbent is desorbed due to negative pressure generated in the intake manifold 15. Specifically, air in the atmosphere is introduced into the canister 11 through the intake line 16 and the evaporated fuel adsorbed on the adsorbent is desorbed. Then, air containing the evaporated fuel is discharged into and burned in the internal combustion engine 13.

[1-2. Canister]

Figure 2:
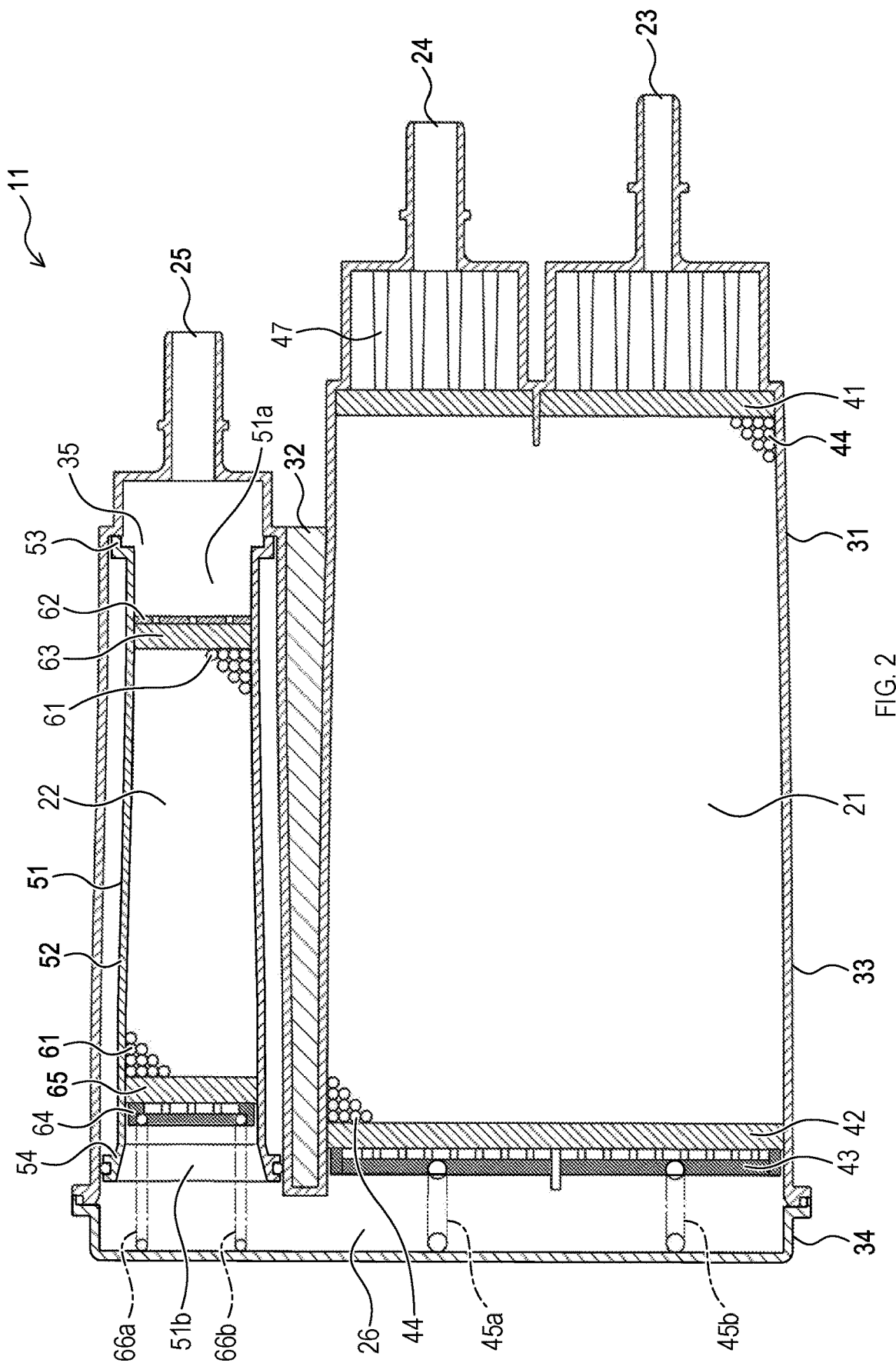
FIG. 2 is a cross-sectional view of a canister of a first embodiment.

The configuration of the canister 11 will be described with reference to FIG. 2.

The canister 11 comprises an outer case 31. An inside of the outer case 31 is partitioned, by a separation wall 32, into two spaces: a main chamber 21 and a sub chamber 22.

The main chamber 21 is provided with, on a first end thereof, a charge port 23 and a purge port 24. The charge port 23 is coupled to the fuel tank 12. The charge port 23 is configured to draw the evaporated fuel. The purge port 24 is coupled to the intake manifold 15. The purge port 24 is configured to discharge the evaporated fuel into the internal combustion engine 13.

The sub chamber 22 is provided with, on a first end thereof, an atmosphere port 25. The atmosphere port 25 is provided on the same side as the charge port 23 and the purge port 24. The atmosphere port 25 is coupled to the intake line 16. That is, the atmosphere port 25 is open to the atmosphere through the intake line 16.

The charge port 23, the purge port 24, and the atmosphere port 25 each function as a connection port connecting the inside and an outside of the outer case 31 to each other.

The main chamber 21 and the sub chamber 22 communicate each other through a connection path 26 at respective second ends of the main chamber 21 and the sub chamber 22. The respective second ends are located opposite to the charge port 23, the purge port 24, and the atmosphere port 25. Thus, the main chamber 21, the sub chamber 22, and the connection path 26 form an approximately U-shaped path in the outer case 31.

The outer case 31 comprises a main case body 33 and a lid 34. The main case body 33 forms the main chamber 21 and the sub chamber 22. The lid 34 is joined to the main case body 33, to thereby form the connection path 26.

In the first end of the main chamber 21 leading to the charge port 23 and the purge port 24, a filter 41 is arranged. The filter 41 is supported by supporting columns 47 provided in the main chamber 21.

In the second end of the main chamber 21, which is located opposite to its first end leading to the charge port 23 and the purge port 24 (in other words, adjacent to the connection path 26), a filter 42 is arranged. The filter 42 is supported by a grid 43. The grid 43 is provided with holes (not shown) allowing gas to flow therethrough. Between the filter 41 and the filter 42, activated carbon comprising granular adsorbents 44 (hereinafter, simply referred to as "adsorbents 44") are filled.

Between the grid 43 and the lid 34 of the outer case 31, two springs 45a, 45b are arranged so as to couple the grid 43 and the lid 34 to each other. The springs 45a, 45b each are an elastic member. The springs 45a, 45b bias the adsorbents 44 to the charge port 23 and the purge port 24 via the grid 43 and the filter 42.

The sub chamber 22 is fitted therein with a cylindrical inner case 51 (hereinafter, appropriately referred to as "inner case 51") filled with activated carbon comprising granular adsorbents 61 (hereinafter, simply referred to as "adsorbents 61"). The inner case 51 includes a first opening 51a in a first end of the inner case 51 and a second opening 51b in a second end of the inner case 51. The first opening 51a communicates the atmosphere port 25. The second opening 51b communicates the connection path 26.

The inner case 51 comprises a main body 52, an abutting portion 53, and a flange 54. The main body 52 includes therein the adsorbents 61. The abutting portion 53 is provided to a first end of the main body 52 leading to the atmosphere port 25. The flange 54 is provided to a second end of the main body 52, which is located opposite to the first end of the flange 54.

The abutting portion 53 abuts the outer case 31 in the first end of the main body 52 leading to the atmosphere port 25. Specifically, the outer case 31 and the abutting portion 53 abut each other in a stepped portion of the sub chamber 22. The stepped portion is located closer to the first end of the sub chamber 22 than it is to the second end.

Figure 3:
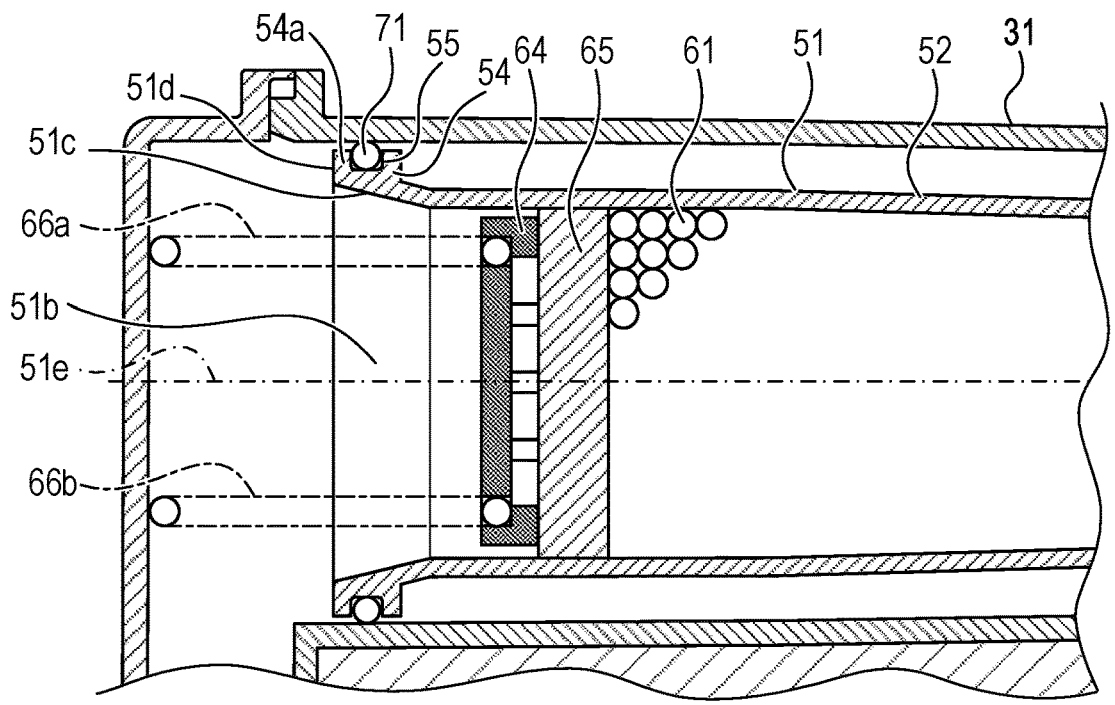
FIG. 3 is a cross-sectional view of one of openings of an inner case of the canister shown in FIG. 2, the one opening allowing an adsorbent to be fed therethrough.

The flange 54 is a joining portion to be joined to the outer case 31. The flange 54 is provided to the second end of the main body 52, which is located opposite to the first end leading to the atmosphere port 25. The flange 54 has a shape protruding from the main body 52 to an inner surface of the outer case 31. As shown in FIG. 3, a leading end 54a of the flange 54 is formed to have a slightly smaller diameter than a diameter of the inner surface of the outer case 31. That is, a gap is formed between the leading end 54a of the flange 54 and the inner surface of the outer case 31.

The gap between the outer case 31 and the leading end 54a of the flange 54 is provided with a sealing member 71 that seals the gap. The sealing member 71 comprises an O-ring that is fitted into a groove 55 formed in the flange 54. The inner case 51 is joined to the inner surface of the outer case 31 via the sealing member 71.

The second opening 51b in the second end of the inner case 51 is shaped such that an opening area is reduced toward the first end of the inner case 51 leading to the atmosphere port 25. Specifically, in a cross-section along a central axis 51e of the cylindrical inner case 51, an inner surface 51c of the second opening 51b inwardly leans toward the first end of the inner case 51 with respect to a surface perpendicular to the central axis 51e as shown in FIG. 3. Furthermore, a surface 51d of the flange 54, which faces away from the atmosphere port 25 (that is, located closer to the second end of the inner case 51 than it is to the first end), is approximately perpendicular to the central axis 51e. A width of the surface 51d in the cross-section along the central axis 51e is smaller than an average particle diameter of the adsorbents 61. Here, the term "approximately perpendicular" means being substantially perpendicular. The average particle diameter of the adsorbents 61 refers to an average volume particle diameter. Specifically, the average particle diameter means a particle diameter at a cumulative value of 50% in a particle size distribution obtained by sieving the adsorbents 61 in sequence from one having the smallest volume.

Referring back to FIG. 2, a partition wall plate 62 is fixed inside the main body 52 at a position closer to the first end of the main body 52 than it is to the second end. The partition wall plate 62 is a partition wall supporting the adsorbents 61 inside the main body 52. The partition wall plate 62 is provided with holes allowing gas to flow therethrough. A filter 63 is supported on a surface of the partition wall plate 62 facing the connection path 26.

In the main body 52, at a position closer to the connection path 26 than it is to the first end, a filter 65 is arranged. The filter 65 is supported by a grid 64. The grid 64 is provided with holes (not shown) allowing gas to flow therethrough. Between the filter 63 and the filter 65, the adsorbents 61 are filled.

As in the main chamber 21, two springs 66a, 66b are arranged between the grid 64 and the lid 34 of the outer case 31. The springs 66a, 66b each are an elastic member. The springs 66a, 66b bias the adsorbents 61 to the atmosphere port 25 via the grid 64 and the filter 65.

In assembling the canister 11, the inner case 51 is first fitted into the main case body 33 of the outer case 31. Specifically, the inner case 51 is inserted from an opening of the outer case 31. Then, the inner case 51 is slid into the sub chamber 22 to be fitted therein.

Subsequently, the filter 63 is inserted from the second opening 51b of the inner case 51 located opposite to the first end leading to the atmosphere port 25. The adsorbents 61 are thereafter fed into the inner case 51. Then, the inner case 51 is closed with the filter 65. Similarly, the filter 41, the adsorbents 44, and the filter 42 are inserted and/or fed in this order into the main chamber 21 from an opening located at the second end of the main chamber 21.

Subsequently, the grids 43, 64, and the spring 45a, 45b, 66a, 66b are arranged. The lid 34 is thereafter attached to the main case body 33 to weld an outer circumferential portion of the lid 34 to the main case body 33. Accordingly, the canister 11 is completed.

[1-3. Effects]

The above-detailed embodiment can bring effects to be described below.

(1a) The canister 11 comprises, at the second end of the inner case 51, the sealing member 71 that seals the gap between the outer case 31 and the flange 54 of the inner case 51. Thus, the adsorbents 61 are inhibited from entering the gap between the outer case 31 and the inner case 51 when being filled.

(1b) The second opening 51b, which is located at the second end of the inner case 51, is shaped such that the opening area is reduced toward the first end of the inner case 51 leading to the atmosphere port 25.

According to the above configuration, the second opening 51b is wider at the second end of the inner case 51. Thus, the second opening 51b facilitates feeding of the adsorbents 61 therefrom.

In the above-described embodiment, in particular, the surface 51d of the flange 54, which faces away from the atmosphere port 25, is approximately perpendicular to the central axis 51e of the inner case 51. The width of the surface 51d in the cross-section along the central axis 51e is smaller than the average particle diameter of the adsorbents 61.

In a case where the surface 51d of the flange 54, which faces away from the atmosphere port 25, is approximately perpendicular to the central axis 51e of the inner case 51, the adsorbents 61 tend to remain on the surface 51d. In the above-described embodiment, however, the width of the surface 51d in the cross-section along the central axis 51e is smaller than the average particle diameter of the adsorbents 61, whereby the adsorbents 61 are inhibited from remaining on the surface 51d when being filled.

(1c) The canister 11 comprises the springs 66a, 66b, each of which is an elastic member biasing the adsorbents 61 placed in the inner case 51 to the atmosphere port 25. Thus, even if a filling amount of the adsorbents 61 is uneven, the springs 66a, 66b fix the adsorbents 61 inside the inner case 51. As a result, the adsorbents 61 are inhibited from flowing and being pulverized in the inner case 51 due to vibration of a vehicle. Accordingly, the adsorbents 61 are inhibited from clogging the filters 63, 65 due to pulverization of the adsorbents 61.

2. Second Embodiment

The canister of the second embodiment has the same basic configuration as in the first embodiment. Accordingly, only the difference(s) will be described below. A component with the same reference numeral as in the first embodiment is identically configured. For details of such a component, a reference is made to the above descriptions.

Figure 4:
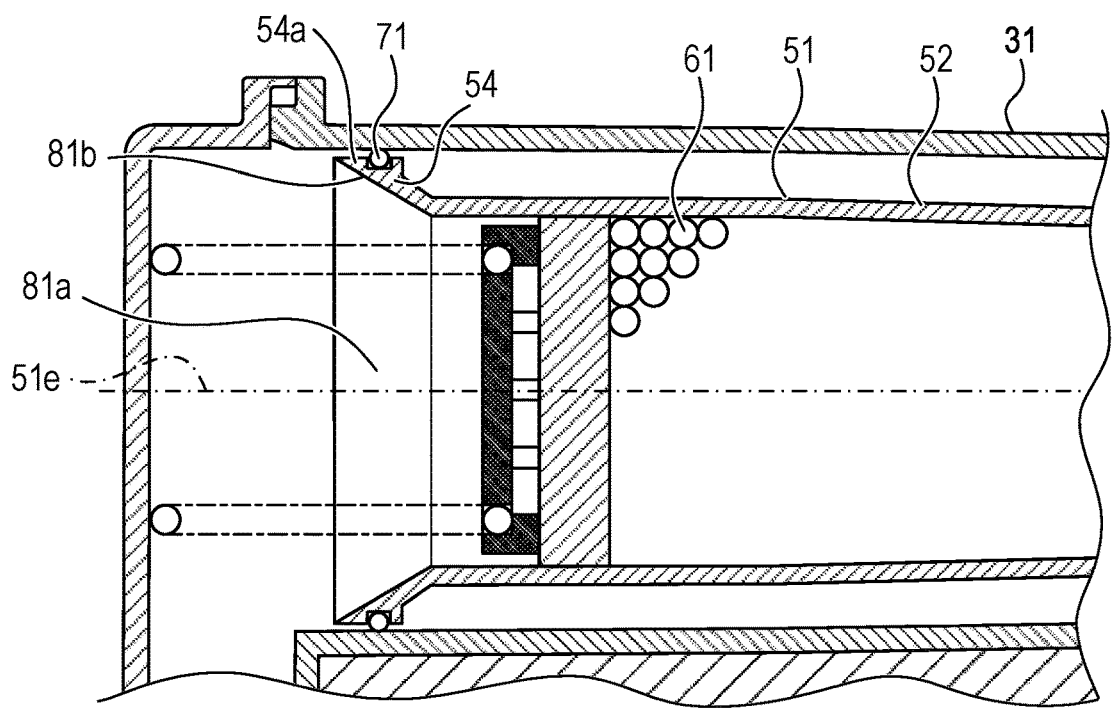
FIG. 4 is a partial cross-sectional view of a canister of a second embodiment.

As shown in FIG. 4, the canister 11 of the second embodiment is different from the canister 11 of the first embodiment in respect of a shape of the second end of the inner case 51.

In the above-described first embodiment, the surface 51d of the flange 54, which is located opposite to the atmosphere port 25, is approximately perpendicular to the central axis 51e in the cross-section along the central axis 51e. In contrast, in the second embodiment, a surface 81b of the flange 54, which is located in the second end of the inner case 51, inwardly leans toward the atmosphere port 25 with respect to the surface perpendicular to the central axis 51e in the cross-section along the central axis 51e. The surface 81b of the flange 54, which is located in the second end of the inner case 51, is also referred to as an inner surface of an opening 81a located in the second end of the inner case 51. In the second embodiment, a surface corresponding to the surface 51d of the first embodiment is not formed in the flange 54.

According to the above configuration, the adsorbents 61, which bump or have bumped the flange 54 while being filled, move toward the main body 52 along the surface 81b. Thus, the adsorbents 61 are further inhibited from remaining on the flange 54 as compared to the canister 11 of the first embodiment.

3. Third Embodiment

The canister of the third embodiment has the same basic configuration as in the first embodiment. Accordingly, only the difference(s) will be described below. A component with the same reference numeral as in the first embodiment is identically configured. For details of such a component, a reference is made to the above descriptions.

Figure 5:
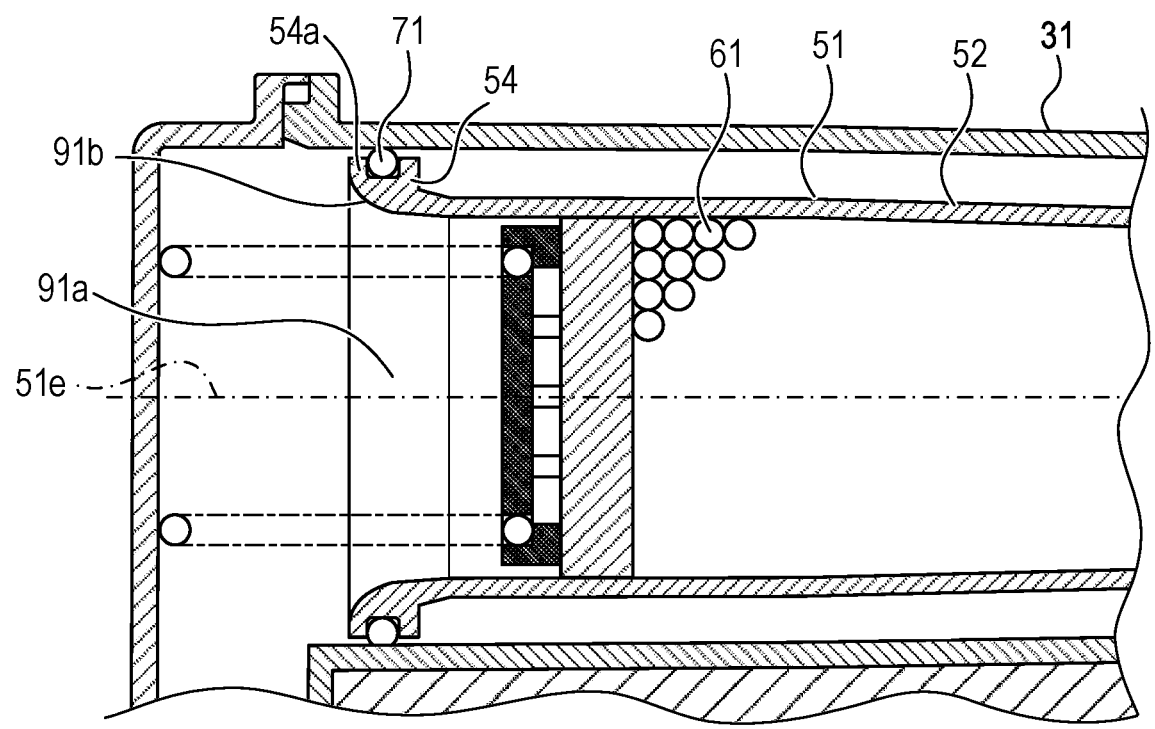
FIG. 5 is a partial cross-sectional view of a canister of a third embodiment.

As shown in FIG. 5, the canister 11 of the third embodiment is different from the canister 11 of the first embodiment in respect of a shape of the second end of the inner case 51.

In the above-described first embodiment, the surface 51d of the flange 54, which faces away from the atmosphere port 25, is approximately perpendicular to the central axis 51e in the cross-section along the central axis 51e. In contrast, in the third embodiment, a surface 91b of the flange 54, which is located opposite to the atmosphere port 25, is shaped so as to gradually inwardly curve toward the atmosphere port 25 with respect to the central axis 51e. The surface 91b of the flange 54, which is located in the second end of the inner case 51, is also referred to as an inner surface of an opening 91a located in the second end of the inner case 51.

According to the above configuration, the adsorbents 61, which bump or have bumped the flange 54 while being filled, move toward the main body 52 along the surface 91b. Thus, the adsorbents 61 are further inhibited from remaining on the flange 54 as compared to the canister 11 of the first embodiment.

4. Other Embodiments

Embodiments of the present disclosure have been described hereinabove; however, the present disclosure should not be limited to the above-described embodiments and may be carried out in variously modified manner.

(4a) The shape of the second end of the inner case 51 is not limited to the shapes of the above-described embodiments.

For example, the inner surface Mc of the second opening 51b located at the second end of the inner case 51 may have a stair-like shape that extends toward the atmosphere port 25 in a multistage manner with respect to the central axis 51e of the inner case 51. Furthermore, the second opening 51b located at the second end of the inner case 51 may be formed to have a constant opening area.

In the above-described first embodiment, the surface 51d of the flange 54, which faces away from the atmosphere port 25, is an approximately perpendicular plane to the central axis 51e of the inner case 51. However, the surface 51d may have a shape similar to the inner surface 51c of the second opening 51b. That is, the surface 51d may have a shape that linearly inclines towards the atmosphere port 25 with respect to the central axis 51e of the cylindrical inner case 51.

(4b) A method of sealing the gap between the outer case 31 and the flange 54 is not limited to the method of the above-described embodiments.

For example, the groove 55 to be provided with the O-shaped ring may be formed in the outer case 31, instead in the flange 54. Furthermore, a gasket may be replaced for the O-shaped ring to seal the gap as the sealing member 71.

(4c) In the above-described embodiments, the cylindrical inner case 51 filled with the adsorbents 61 is fitted into the sub chamber 22. However, the inner case 51 may be fitted into the main chamber 21. Furthermore, the inner case 51 may be fitted into both the main chamber 21 and the sub chamber 22.

Moreover, in the above-described embodiments, the inner case 51 is arranged across the entirety of the sub chamber 22. However, the inner case 51 may be arranged in a part of the sub chamber 22. For example, the inner case 51 may be arranged in a part of the sub chamber 22 adjacent to the atmosphere port 25 and the remaining part of the sub chamber 22 may be filled with an additional adsorbent.

Here, the canister 11 is required to reduce an evaporated fuel (DBL; Diurnal Breathing Loss) generated due to a change in outdoor temperature during long hours of parking. In order to reduce the DBL, it has been proved to be effective to increase the L/D of the sub chamber 22 to some extent.

Due to a required specification of the canister 11, it is considered that a filing amount of the adsorbents 61 in the sub chamber 22 is reduced to some extent with a design of the outer case 31 unchanged. In this case, if the filling amount of the adsorbents 61 in the sub chamber 22 is reduced without the sub chamber 22 provided with the inner case 51 therein, a length L of an adsorbent layer is reduced. Consequently, the L/D of the sub chamber 22 decreases.

In contrast, if the inner case 51 is fitted into the sub chamber 22 as in the above-described embodiments, it is possible to adjust and reduce an effective cross-sectional diameter D of the adsorbent layer by appropriately changing a size of the inner case 51. Thus, it is possible to both ensure a required L/D of the sub chamber 22 and reduce the filling amount of the adsorbents 61 in the sub chamber 22.

For the reason described above, it is preferable to fit the inner case 51 at least inside the sub chamber 22.

(4d) In the above-described embodiments, the canister 11 comprises two chambers filled with the adsorbents: the main chamber 21 and the sub chamber 22. However, the canister 11 may comprise one adsorption chamber, or three or more adsorbent chambers.

(4e) In the above-described embodiments, the abutting portion 53 is a step-like protrusion. However, the abutting portion 53 is not limited to this shape. For example, the abutting portion 53 may be a flange or the like protruding approximately perpendicularly from the main body 52 to the inner surface of the outer case 31.

(4f) A method of assembling the canister 11 is not limited to the method of the above-described embodiments. For example, the filter 63 may be inserted into the inner case 51, which may thereafter be fitted into the outer case 31. Subsequently, the adsorbents 61 may be fed into the inner case 51.

(4g) The elastic member, which biases the adsorbents 44, 61 to the purge port 24 and the atmosphere port 25 respectively, is not limited to springs. For example, the elastic member may be another spring such as a plate spring, or a cushioning member with elasticity such as urethane.

(4h) A function of a single component in the aforementioned embodiments may be divided into by two or more components. Functions of two or more components may be integrated into one component. Furthermore, a part of the configurations of the aforementioned embodiments may be omitted. At least a part of the configurations of the aforementioned embodiments may be added to or replaced with other configurations of the aforementioned embodiments.

What is claimed is:

1. A canister that adsorbs and desorbs an evaporated fuel generated in a fuel tank of a vehicle, the canister comprising:
    an outer case;
    an inner case having a cylindrical shape, the inner case fitted into the outer case and filled therein with an adsorbent in a granular form, and the inner case including a first end and a second end, which is located opposite to the first end;
    a connecting port connecting an inside and an outside of the outer case to each other, wherein the first end of the inner case leads to the connecting port; and
    a sealing member provided to the second end of the inner case, the sealing member sealing a gap between the outer case and a joining portion of the inner case, the joining portion joining the inner case to the outer case,
    wherein the second end of the inner case comprises an opening for filling the inner case with the absorbent, the opening having a shape such that an area of the opening reduces as the opening extends from the second end toward the first end,
    wherein the inner case comprises:
        a main body containing the adsorbent therein, the main body including a first end and a second end, the first end of the main body leading to the connecting port and the second end of the main body being located opposite to the first end of the main body; and
        a flange provided to the second end of the main body, the flange having a shape protruding from the main body to an inner surface of the outer case,
    wherein the flange comprises the joining portion,
    wherein a surface of the flange facing away from the connecting port is approximately perpendicular to a central axis of the inner case, and
    wherein, in a cross-section along the central axis, a width of the surface of the flange facing away from the connecting port is smaller than an average particle diameter of the adsorbent.

2. The canister according to claim 1,
    wherein the inner case comprises:
        a main body containing the adsorbent therein, the main body including a first end and a second end, the first end of the main body leading to the connecting port and the second end of the main body being located opposite to the first end of the main body; and
        a flange provided to the second end of the main body, the flange protruding from the main body to an inner surface of the outer case,
    wherein the flange comprises the joining portion, and
    wherein, in a cross-section along a central axis of the inner case, a surface of the flange located opposite to the connecting port inwardly leans toward the connecting port with respect to a surface perpendicular to the central axis.

3. The canister according to claim 1,
    wherein the inner case comprises:
        a main body containing the adsorbent therein, the main body including a first end and a second end, the first end of the main body leading to the connecting port and the second end of the main body being located opposite to the first end of the main body; and
        a flange provided to the second end of the main body, the flange protruding from the main body to an inner surface of the outer case,
    wherein the flange comprises the joining portion, and
    wherein, in a cross-section along a central axis of the inner case, a surface of the flange located opposite to the connecting port has a shape inwardly and gradually curving toward the connecting port with respect to the central axis.

4. The canister according to claim 1, further comprising an elastic member biasing the adsorbent to the connecting port.

5. The canister according to claim 1, further comprising:
    a charge port configured to draw the evaporated fuel;
    a purge port configured to discharge the evaporated fuel;
    an atmosphere port open to the atmosphere;
    a main chamber provided with the charge port and the purge port; and
    a sub chamber communicating the main chamber and provided with the atmosphere port,
    wherein the outer case forms the sub chamber and the main chamber,
    wherein the inner case is fitted into the sub chamber, and
    wherein the connecting port comprises the atmosphere port.

* * * * *